United States Patent
Denis et al.

(10) Patent No.: US 11,426,814 B2
(45) Date of Patent: Aug. 30, 2022

(54) SYSTEMS AND METHODS FOR PROVIDING LOCATION SERVICES FOR A WELDING POWER SUPPLY

(71) Applicant: ILLINOIS TOOL WORKS INC., Glenview, IL (US)

(72) Inventors: Marc Lee Denis, Lena, WI (US); Christopher Hsu, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 362 days.

(21) Appl. No.: 16/526,532

(22) Filed: Jul. 30, 2019

(65) Prior Publication Data

US 2020/0055136 A1    Feb. 20, 2020

Related U.S. Application Data

(63) Continuation of application No. 14/572,482, filed on Dec. 16, 2014, now Pat. No. 10,363,627.

(51) Int. Cl.
*B23K 9/10* (2006.01)
*H04W 4/029* (2018.01)
(Continued)

(52) U.S. Cl.
CPC .......... *B23K 9/1087* (2013.01); *B23K 9/1006* (2013.01); *B23K 9/1062* (2013.01);
(Continued)

(58) Field of Classification Search
CPC .. B23K 9/1087; B23K 9/1006; B23K 9/1062; B23K 9/167; B23K 9/173; B23K 9/10;
(Continued)

(56) References Cited

U.S. PATENT DOCUMENTS

| 4,216,367 A | 8/1980 | Risberg |
| 5,499,178 A | 3/1996 | Mohan |

(Continued)

FOREIGN PATENT DOCUMENTS

| CN | 2353480 | 12/1999 |
| CN | 2384730 | 6/2000 |

(Continued)

OTHER PUBLICATIONS

Unidex's Lean, mean assembly machine', MRO Today, Jun./Jul. 2005, pp. 11-12, www.mrotoday.com.

(Continued)

*Primary Examiner* — Brian W Jennison
(74) *Attorney, Agent, or Firm* — McAndrews, Held & Malloy, Ltd.

(57) ABSTRACT

Embodiments described herein include wireless control of a welding power supply via portable electronic devices, such as dedicated original equipment manufacturer (OEM) welding remote devices, cellular radio telephones, satellite radio telephones, laptops computers, tablet computers, and so forth. In particular, operating parameters and statuses of the welding power supply may be modified by the portable electronic device, as well as be displayed on the portable electronic device. A pairing procedure may be used to pair the welding power supply and the portable electronic device in a wireless communication network. Furthermore, in certain embodiments, a method of providing location services for the welding power supply includes utilizing location data for the portable electronic device controlling the welding power supply as an approximation for the location of the welding power supply.

24 Claims, 7 Drawing Sheets

(51) Int. Cl.
  *B23K 9/167* (2006.01)
  *B23K 9/173* (2006.01)
  *H04W 4/02* (2018.01)
  *H04W 12/08* (2021.01)
  *H04W 4/80* (2018.01)
  *H04W 12/50* (2021.01)
  *H04W 12/04* (2021.01)

(52) U.S. Cl.
  CPC .............. *B23K 9/167* (2013.01); *B23K 9/173* (2013.01); *H04W 4/02* (2013.01); *H04W 4/029* (2018.02); *H04W 4/80* (2018.02); *H04W 12/08* (2013.01); *H04W 12/50* (2021.01); *H04W 4/023* (2013.01); *H04W 12/04* (2013.01)

(58) Field of Classification Search
  CPC ....... H04W 4/008; H04W 4/02; H04W 4/023; H04W 4/021; H04W 12/04; H04W 12/08
  See application file for complete search history.

(56) References Cited

U.S. PATENT DOCUMENTS

| | | | |
|---|---|---|---|
| 5,500,512 A | 3/1996 | Goldblatt | |
| 5,553,810 A | 9/1996 | Bobeczko | |
| 5,692,700 A | 12/1997 | Bobeczko | |
| 5,808,885 A | 9/1998 | Dew | |
| 6,016,528 A | 1/2000 | Jaramillo | |
| 6,087,622 A | 7/2000 | Summers | |
| 6,091,048 A | 7/2000 | Lanouette | |
| 6,248,975 B1 | 6/2001 | Lanouette | |
| 6,267,291 B1 | 7/2001 | Blankenship | |
| 6,417,995 B1 | 7/2002 | Wu | |
| 6,459,989 B1 | 10/2002 | Kirkpatrick | |
| 6,510,984 B2 | 1/2003 | Blankenship et al. | |
| 6,536,660 B2 | 3/2003 | Blankenship et al. | |
| 6,552,303 B1 | 4/2003 | Blankenship | |
| 6,563,085 B2 | 5/2003 | Lanouette | |
| 6,583,386 B1 | 6/2003 | Ivkovich | |
| 6,624,388 B1 | 9/2003 | Blankenship et al. | |
| 6,636,776 B1 | 10/2003 | Barton et al. | |
| 6,708,877 B2 | 3/2004 | Blankenship et al. | |
| 6,710,299 B2 | 3/2004 | Blankenship | |
| 6,728,619 B2 | 4/2004 | Adachi | |
| 6,734,393 B1 | 5/2004 | Friedl | |
| 6,849,826 B2 | 2/2005 | Hayes | |
| 6,852,949 B2 | 2/2005 | Lanouette | |
| 6,867,386 B1 | 3/2005 | Niwa | |
| 6,909,066 B2 | 6/2005 | Zheng | |
| 7,032,814 B2 | 4/2006 | Blankenship | |
| 7,038,167 B2 | 5/2006 | Hayes | |
| 7,045,742 B2 | 5/2006 | Feichtinger | |
| 7,167,708 B2 | 1/2007 | Backes | |
| 7,245,875 B2 | 7/2007 | Clark | |
| 7,307,241 B2 | 12/2007 | Hayes | |
| 7,342,210 B2 | 3/2008 | Fergason | |
| 7,363,137 B2 | 4/2008 | Brant | |
| 7,375,304 B2 | 5/2008 | Kainec et al. | |
| 7,574,172 B2 | 8/2009 | Clark et al. | |
| 7,643,890 B1 | 1/2010 | Hillen et al. | |
| 7,761,336 B1 | 7/2010 | Blankenship | |
| 7,810,937 B2 | 10/2010 | Garbergs | |
| 7,873,495 B2 | 1/2011 | Lindell | |
| 7,979,162 B2 | 7/2011 | Niemela | |
| 7,996,276 B2 | 8/2011 | Blankenship et al. | |
| 8,239,532 B1 | 8/2012 | Roskind | |
| 8,284,094 B2 | 10/2012 | Hamai | |
| 8,471,525 B2 | 6/2013 | Kim | |
| 8,569,646 B2 | 10/2013 | Daniel | |
| 8,592,722 B2 | 11/2013 | Ulrich | |
| 8,686,318 B2 | 4/2014 | Albrecht et al. | |
| 8,688,815 B2 | 4/2014 | Chantry | |
| 8,711,750 B2 | 4/2014 | Ling | |
| 8,747,116 B2 | 6/2014 | Zboray et al. | |
| 8,785,817 B2 | 7/2014 | Luck | |
| 8,851,896 B2 | 10/2014 | Wallace | |
| 2002/0119770 A1 | 8/2002 | Twitchell | |
| 2002/0168937 A1 | 11/2002 | Clark | |
| 2003/0062351 A1 | 4/2003 | Davidson | |
| 2003/0094487 A1 | 5/2003 | Blankenship | |
| 2003/0141973 A1 | 7/2003 | Yeh | |
| 2003/0160037 A1 | 8/2003 | Hayes | |
| 2003/0177228 A1 | 9/2003 | Vigouroux | |
| 2003/0210140 A1 | 11/2003 | Menard | |
| 2004/0000498 A1 | 1/2004 | Weissbrod | |
| 2004/0026392 A1 | 2/2004 | Feichtinger | |
| 2004/0162630 A1 | 8/2004 | Hillen | |
| 2005/0110636 A1 | 5/2005 | Ghaffari | |
| 2005/0145688 A1 | 7/2005 | Milenkovic | |
| 2005/0152294 A1* | 7/2005 | Yu .................... H04M 1/72412 370/310 |
| 2005/0197115 A1 | 9/2005 | Clark et al. | |
| 2005/0258154 A1 | 11/2005 | Blankenship | |
| 2005/0275531 A1 | 12/2005 | Johnson | |
| 2006/0022867 A1 | 2/2006 | Hessing | |
| 2006/0070987 A1 | 4/2006 | Daniel | |
| 2006/0071782 A1 | 4/2006 | Ahmed | |
| 2006/0173619 A1* | 8/2006 | Brant ........................ G01S 5/02 701/50 |
| 2006/0187842 A1 | 8/2006 | French | |
| 2006/0207980 A1 | 9/2006 | Jacovetty | |
| 2007/0056073 A1 | 3/2007 | Martin | |
| 2007/0080149 A1 | 4/2007 | Albrecht et al. | |
| 2007/0080150 A1 | 4/2007 | Albrecht | |
| 2007/0080151 A1 | 4/2007 | Albrecht et al. | |
| 2007/0080152 A1 | 4/2007 | Albrecht | |
| 2007/0080153 A1 | 4/2007 | Albrecht et al. | |
| 2007/0080154 A1 | 4/2007 | Ott | |
| 2007/0251932 A1 | 11/2007 | Vogel | |
| 2008/0055154 A1 | 3/2008 | Martucci | |
| 2008/0061049 A1 | 3/2008 | Albrecht | |
| 2008/0116185 A1 | 5/2008 | Luck et al. | |
| 2008/0116186 A1 | 5/2008 | Luck et al. | |
| 2008/0149611 A1 | 6/2008 | Roth | |
| 2009/0089300 A1 | 4/2009 | Vicente | |
| 2009/0200283 A1 | 8/2009 | Bland | |
| 2009/0272221 A1 | 11/2009 | Long | |
| 2009/0272222 A1 | 11/2009 | Long | |
| 2010/0155384 A1* | 6/2010 | Albrecht .............. B23K 9/1081 219/133 |
| 2010/0176106 A1 | 7/2010 | Christensen | |
| 2010/0314371 A1 | 12/2010 | Davidson | |
| 2011/0133995 A1 | 6/2011 | Pascolini | |
| 2011/0180517 A1* | 7/2011 | Schneider ............ B23K 9/1006 219/108 |
| 2011/0180522 A1 | 7/2011 | Bunker | |
| 2011/0248008 A1 | 10/2011 | Long | |
| 2012/0012561 A1 | 1/2012 | Wiryadinata | |
| 2012/0158979 A1 | 6/2012 | Lee | |
| 2012/0241428 A1 | 9/2012 | Kowaleski | |
| 2012/0265996 A1* | 10/2012 | Kaal ..................... H04W 48/08 713/182 |
| 2013/0092672 A1 | 4/2013 | Peters | |
| 2013/0112673 A1 | 5/2013 | Petrilla et al. | |
| 2013/0116849 A1 | 5/2013 | Kooken | |
| 2014/0048522 A1 | 2/2014 | Dina | |
| 2015/0350821 A1 | 12/2015 | Dina | |

FOREIGN PATENT DOCUMENTS

| | | |
|---|---|---|
| CN | 1841437 | 10/2006 |
| CN | 1882181 | 12/2006 |
| CN | 101378877 | 3/2009 |
| CN | 101516561 | 8/2009 |
| CN | 102204220 | 9/2011 |
| CN | 102239025 | 11/2011 |
| DE | 19654122 | 1/1998 |
| DE | 10058301 | 5/2002 |
| DE | 202006009014 | 8/2006 |
| EP | 0852986 | 7/1998 |
| EP | 1112800 | 7/2001 |
| EP | 1229343 | 8/2002 |

(56) References Cited

FOREIGN PATENT DOCUMENTS

| | | |
|---|---|---|
| EP | 1681122 | 7/2006 |
| EP | 1833197 | 9/2007 |
| JP | S58107272 | 6/1983 |
| JP | H08335238 | 12/1996 |
| JP | H10143226 | 5/1998 |
| JP | H10164676 | 6/1998 |
| JP | 10305366 | 11/1998 |
| JP | 3019016 | 3/2000 |
| JP | 2002032880 | 1/2002 |
| JP | 2003317055 | 11/2003 |
| JP | 2004334439 | 11/2004 |
| JP | 2005102218 | 4/2005 |
| JP | 2009507580 | 2/2009 |
| JP | 2009512274 | 3/2009 |
| JP | 2009268144 | 11/2009 |
| KR | 20120068275 A | 6/2012 |
| WO | 0112376 | 2/2001 |
| WO | 0207014 | 1/2002 |
| WO | 0247860 | 6/2002 |
| WO | 02085566 | 10/2002 |
| WO | 02086656 | 10/2002 |
| WO | 2005084867 | 9/2005 |
| WO | 2007044135 | 4/2007 |
| WO | 2011094138 | 8/2011 |

OTHER PUBLICATIONS

'What is RFID?', http://www.rfidioumal.eom/article/articleview/1339/1/129/, 5 pages.

"Monnit Wireless Sensors and iMonnit Online Monitoring System User Guide," Monnit Corporation, Oct. 2011.

"Should You Build or Buy Wireless Sensors?," Monnit Corporation, Mar. 2011.

"WIT Wireless Sensors: Low Cost, Reliable and Ready to Use," Monnit Corporation, Jun. 2011.

Fuhr et al., "The Realities of Dealing with Wireless Mesh Networks," 7 pages.

Fuhr et al., Putting Sensors to Work 'Mesh Radio Network Performance in Cargo Containers,' Sensors, Mar. 2005, pp. 13-17 and 18, www.sensorsmaq.com.

International Search Report for PCT application No. PCT/US2013/055002 dated Mar. 5, 2014, 14 pgs.

International Search Report for PCT application No. PCT/US2013/055005 dated Mar. 5, 2014, 15 pgs.

International Search Report for PCT application No. PCT/US2013/055006 dated Mar. 5, 2014, 16 pgs.

International Search Report for PCT application No. PCT/US2013/055007 dated Mar. 5, 2014, 17 pgs.

International Search Report for PCT application No. PCT/US2013/055008 dated Mar. 6, 2014, 15 pgs.

International Search Report from PCT application No. PCT/US2015/056123, dated Jan. 19, 2016, 14 pgs.

Jelicic, Vana, "Power Management in Wireless Sensor Networks with High-Consuming Sensors," Qualifying Doctoral Examination, University of Zagreb, Apr. 2011, http://www.fer.unizg.hr/_download/repository/VJelicic,KDI.pdf.

Ke et al., 'Discovery of Directional Communication Channels in Ad Hoc Networks,' 2 pages.

Lynch, Jerome P., Kenneth J. Loh, "A Summary Review of Wireless Sensors and Sensor Networks for Structural Health Monitoring," The Shock and Vibration Digest, vol. 38, No. 2, Mar. 1, 2006, pp. 91-128.

Macii, David et al., "Power Consumpton Reduction in Wireless Sensor Networks through Optimal Syncronization," 2009 IEEE Instrumentation and Measurement Technology Conference (I2MTC), May 5-7, 2009, Singapore, IEE, Piscataway, NJ, USA, May 5, 20096, pp. 1346-1351.

Rogers, 'DME Basics', http://www.avweb.com/news/avionics/183230-1.html, 3 pages.

Canadian Office Action Appln No. 2,877,809 dated Aug. 17, 2021.

\* cited by examiner

SYSTEMS AND METHODS FOR PROVIDING LOCATION SERVICES FOR A WELDING POWER SUPPLY

BACKGROUND

The present disclosure relates generally to welding systems and, more particularly, to systems and methods for providing location services for welding power supply units.

Welding power supply units are welding systems configured to convert input power to welding output power suitable for use in a welding operation. In certain embodiments, the welding power supply units even generate the power that is converted into the welding output power. Conventionally, welding power supply units are controlled via a control panel disposed on an exterior surface of an enclosure of the welding power supply unit. However, often, welding operators perform welding operations at locations that are at relatively large distances away from the welding power supply units. In such situations, the welding operators often have to walk all the way back to the welding power supply units to modify settings of the welding operations. As such, there is a need for the ability to control welding power supply units from relatively remote locations via wireless remote control devices.

BRIEF DESCRIPTION

Embodiments described herein include wireless control of a welding power supply via portable electronic devices, such as dedicated original equipment manufacturer (OEM) welding remote devices, cellular radio telephones, satellite radio telephones, laptops computers, tablet computers, and so forth. In particular, operating parameters and statuses of the welding power supply may be modified by the portable electronic device, as well as be displayed on the portable electronic device. A pairing procedure may be used to pair the welding power supply and the portable electronic device in a wireless communication network. Furthermore, in certain embodiments, a method of providing location services for the welding power supply includes utilizing location data for the portable electronic device controlling the welding power supply as an approximation for the location of the welding power supply.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
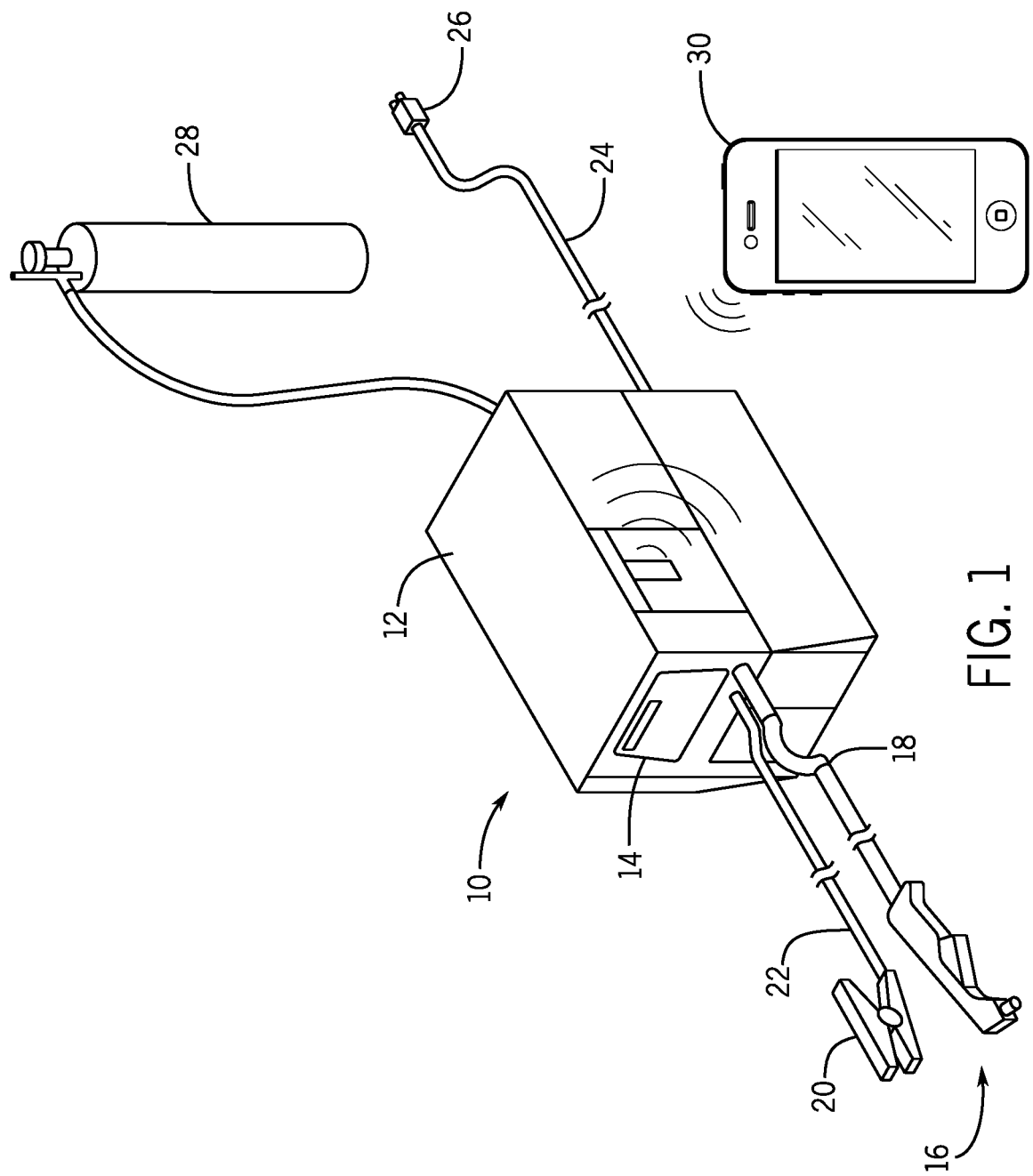
FIG. 1 illustrates a welding-type system configured to communicate wirelessly with a wireless remote control device, in accordance with embodiments of the present disclosure.

FIG. 1 illustrates a welding-type system 10 capable of performing various types of operations. The welding-type system 10 is merely representative of a wide variety of welding-type machines having various sizes, features, and ratings. The welding-type system 10, as contemplated herein, can be configured to not only perform standard welding operations such as tungsten inert gas (TIG) welding, metal inert gas (MIG) welding, and/or stick welding, but can also be capable of performing various other operations that are closely associated with the various welding procedures, such as plasma cutting, carbon arc gouging, and so forth. The welding-type system 10 includes a power supply 12 to condition raw power and generate a power signal suitable for welding applications. The power supply 12 includes a control panel 14 through which an operator may adjust operating parameters of the welding-type system 10. Connected to the power supply 12 is a torch 16 via a weld cable 18 that provides the torch 16 with power and compressed air or gas, where needed.

Also connected to the power supply 12 is a work clamp 20, which is designed to connect to a workpiece (not shown) to be welded and provide a return path. Connecting the work clamp 20 to the power supply 12 is a work cable 22 designed to provide the return path for the welding current from the torch 16 through the workpiece and the work clamp 20. Extending from a rear portion of the power supply 12 is a power cable 24 having a plug 26 for connecting the power supply 12 to either a portable power supply (not shown) or a transmission line power receptacle (not shown). Also connected to the power source is a gas source 28 configured to supply a gas flow to the welding torch 16.

As illustrated in FIG. 1, the power supply 12 may be configured to communicate wirelessly with a wireless remote control device 30, which may be a portable electronic device specifically configured to function as a remote control device for the power supply 12 or may be any type of portable electronic device, such as smart phones, tablet computers, laptop computers, and so forth, that may have software or firmware (as well as security keys) installed thereon to control the power supply 12. In certain embodiments, the wireless remote control device 30 may be used at a welding application location relatively remote from the power supply 12, yet still provide substantially the same display and input devices that the control panel 14 of the power supply 12 provides. In other words, the wireless remote control device 30 may be used as a remote control panel when it is not feasible or practical to use the control panel 14 on the power supply 12. However, it should be noted that the embodiments presented herein enable for additional functionality of the welding power supply 12 to be controlled and/or monitored by the wireless remote control device 30, as described in greater detail herein.

Figure 2:
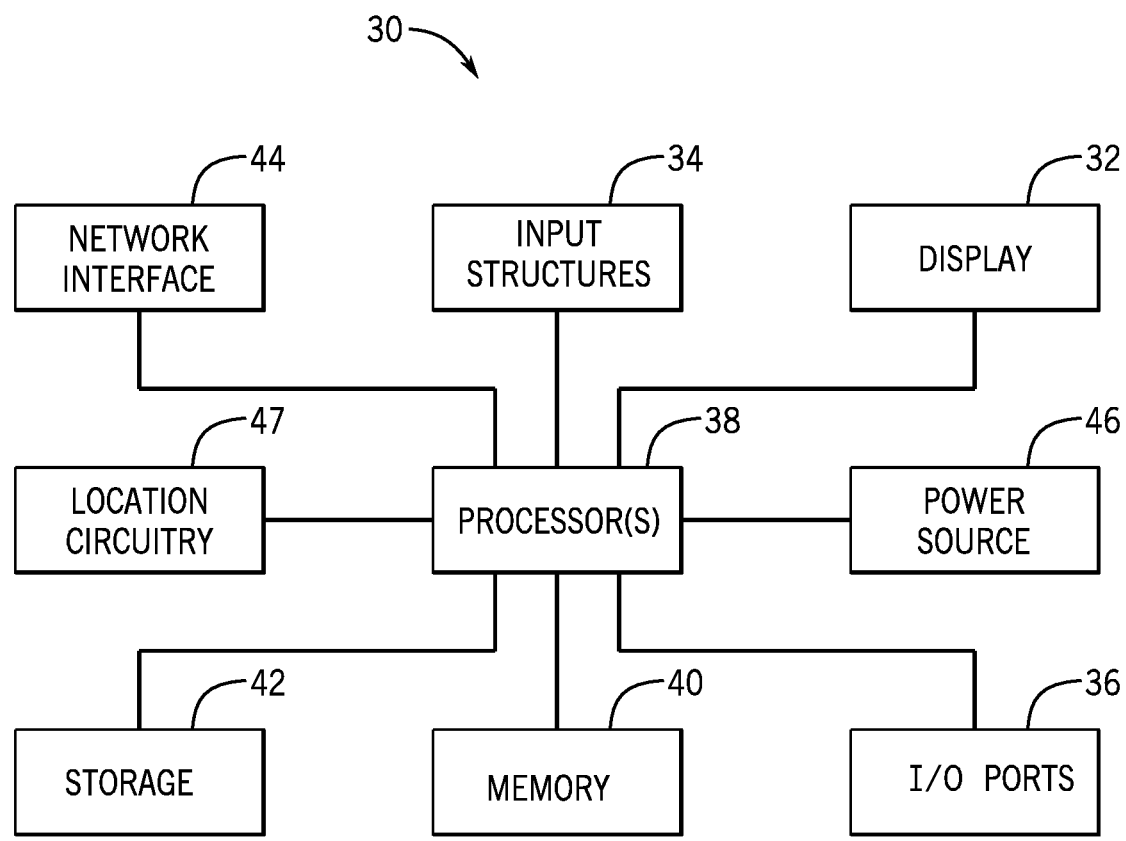
FIG. 2 is a block diagram of a wireless remote control device configured to communicate wirelessly with the welding-type system of FIG. 1, in accordance with embodiments of the present disclosure.

A variety of wireless remote control devices 30 may employ the techniques described herein. FIG. 2, for example, is a block diagram depicting various components that may be present in a suitable wireless remote control device 30 that may be used in the implementation of the present techniques. The wireless remote control device 30 may include a handheld electronic device, a tablet computing device, a notebook computer, and so forth. In other embodiments, the wireless remote control device 30 may include a welding-related device, such as a portable welding wire feeder, a welding helmet, a welding control pendant, a foot pedal, and so forth.

As illustrated in FIG. 2, the wireless remote control device 30 may include, among other things, a display 32, input structures 34, input/output (I/O) ports 36, one or more processor(s) 38, memory 40, nonvolatile storage 42, a network interface 44, and a power source 46. The various functional blocks shown in FIG. 2 may include hardware elements (including certain types of circuitry), software elements (including computer code stored on a non-transitory computer-readable medium), or a combination of both hardware and software elements. It should be noted that FIG. 2 is merely one example of a particular implementation and is intended to illustrate the types of components that may be present in the wireless remote control device 30. Indeed, the various depicted components (e.g., the processor (s) 38) may be separate components, components of a single contained module (e.g., a system-on-a-chip device), or may be incorporated wholly or partially within any of the other elements within the wireless remote control device 30. The components depicted in FIG. 2 may be embodied wholly or in part as machine-readable instructions (e.g., software or firmware), hardware, or any combination thereof.

In the wireless remote control device 30 of FIG. 2, the display 32 may be any suitable electronic display used to display image data (e.g., a liquid crystal display (LCD) or an organic light emitting diode (OLED) display). In some examples, the display 32 may represent one of the input structures 34, enabling users to interact with a user interface of the wireless remote control device 30. In some embodiments, the electronic display 32 may be a touch display that can detect multiple touches at once. Other input structures 34 of the wireless remote control device 30 may include buttons, keyboards, mice, trackpads, rotating knobs, and the like. The I/O ports 36 may enable the wireless remote control device 30 to interface with various other electronic devices.

The processor(s) 38 and/or other data processing circuitry may execute instructions and/or operate on data stored in the memory 40 and/or the nonvolatile storage 42. The memory 40 and the nonvolatile storage 42 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system or an application program. In certain embodiments, the instructions stored in the memory 40 and/or the nonvolatile storage 42 of the wireless remote control device 30 may include software including instructions for enabling the wireless communication with the welding power supply 12, including pairing with the welding power supply 12, enabling prioritization of control between the welding power supply 12 and the wireless remote control device 30, enabling control of the welding power supply 12 via the wireless remote control device 30, and so forth. Furthermore, in certain embodiments, security keys that are used to check whether the wireless remote control device 30 is authorized to communicate with the welding power supply 12, and vice versa, may be stored in the memory 40 and/or the nonvolatile storage 42 of the wireless remote control device 30.

The network interface 44 may include, for example, one or more interfaces for a personal area network (PAN), such as a BLUETOOTH network, for a local area network (LAN), such as an 802.11x-based WI-FI network or a ZIGBEE™ network, and/or for a wide area network (WAN), such as a 4G or LTE cellular network or any other cellular data network. The power source 46 of the wireless remote control device 30 may be any suitable source of energy, such as a rechargeable lithium polymer (Li-poly) battery and/or an alternating current (AC) power converter. In addition, the wireless remote control device 30 may include location circuitry 47, such as a global positioning system (GPS) receiver, that enables the wireless remote control device 30 to determine its location either globally or with respect to a work area (e.g., see work area 94 illustrated in FIG. 7), such as a shipbuilding yard, warehouse, or other work environment. As described in greater detail herein, the ability of the wireless remote control device 30 to determine its own location enables the welding power supply 12 to use the location of the wireless remote control device 30 as an approximate location of the welding power supply 12. In other words, the welding power supply 12 may determine that the wireless remote control device 30 is within local wireless transmission range from the welding power supply 12 and, as such, is relatively close to the location of the wireless remote control device 30, which is determined by its location circuitry 47. Accordingly, the welding power supply 12 and the wireless remote control device 30 may share the location information relating to the wireless remote control device 30, which may be stored in the memory 40 of the wireless remote control device 30 and/or a memory (e.g., memory 64 illustrated in FIG. 4) of the welding power supply 12.

As mentioned above, the wireless remote control device 30 may take the form of a computer or other type of electronic device. Such computers may generally be portable (such as laptop, notebook, and tablet computers). In other embodiments, the wireless remote control device 30 may be, for example, a portable phone (e.g., a smart phone), a media player, a personal data organizer, or any combination of such devices. In particular, in certain embodiments, the wireless remote control device 30 may be a cellular radio telephone utilizing cellular, satellite radio telephone utilizing satellite, BLUETOOTH, or WI-FI to communicate with the power supply 12. In general, the wireless remote control device 30 is a portable electronic device, in other words, handheld or otherwise easily portable by a single human operator.

The wireless communication networking techniques described herein enable seamless and secure exchange of welding parameters, as well as job information and other user data, between the wireless remote control device 30 and the power supply 12. Such wireless communication networking techniques enable welding personnel or other industrial equipment personnel, with little or no experience in areas of communication theory, radio frequency technology, or information technology, to easily assemble and operate wireless communication networks that include a plurality of various equipment and accessories. The wireless communication networking techniques described herein make it easy and intuitive for the aforementioned personnel to manually assemble a wireless network at the job site, and begin using such wireless networks to perform safe and secure control of the welding equipment and accessories, as well as exchange information with other parties in the welding shop or at areas remote from the welding shop.

Figure 3:
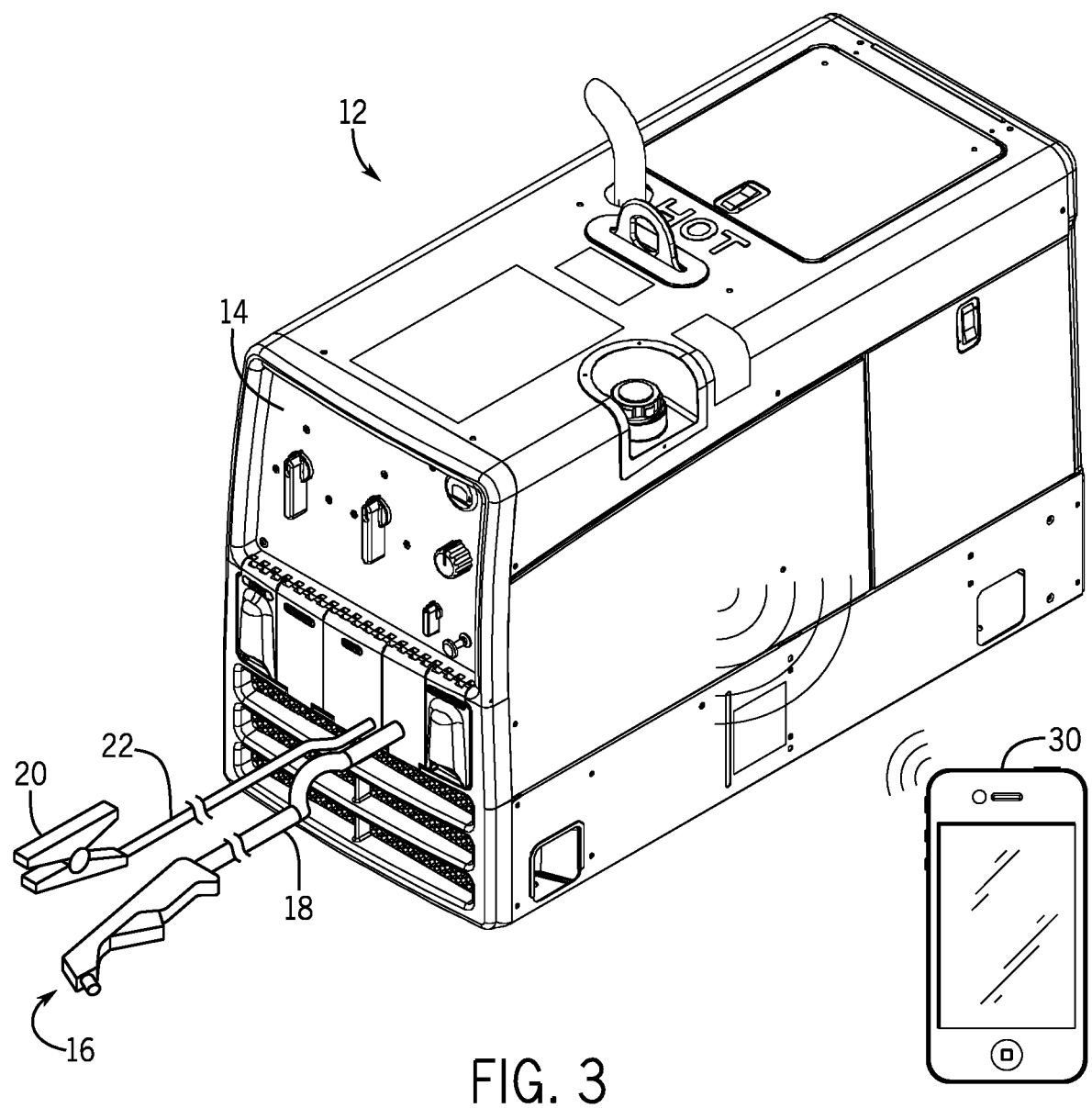
FIG. 3 illustrates an engine-driven welding power supply configured to communicate wirelessly with the wireless remote control device of FIG. 2, in accordance with embodiments of the present disclosure.
Figure 4:
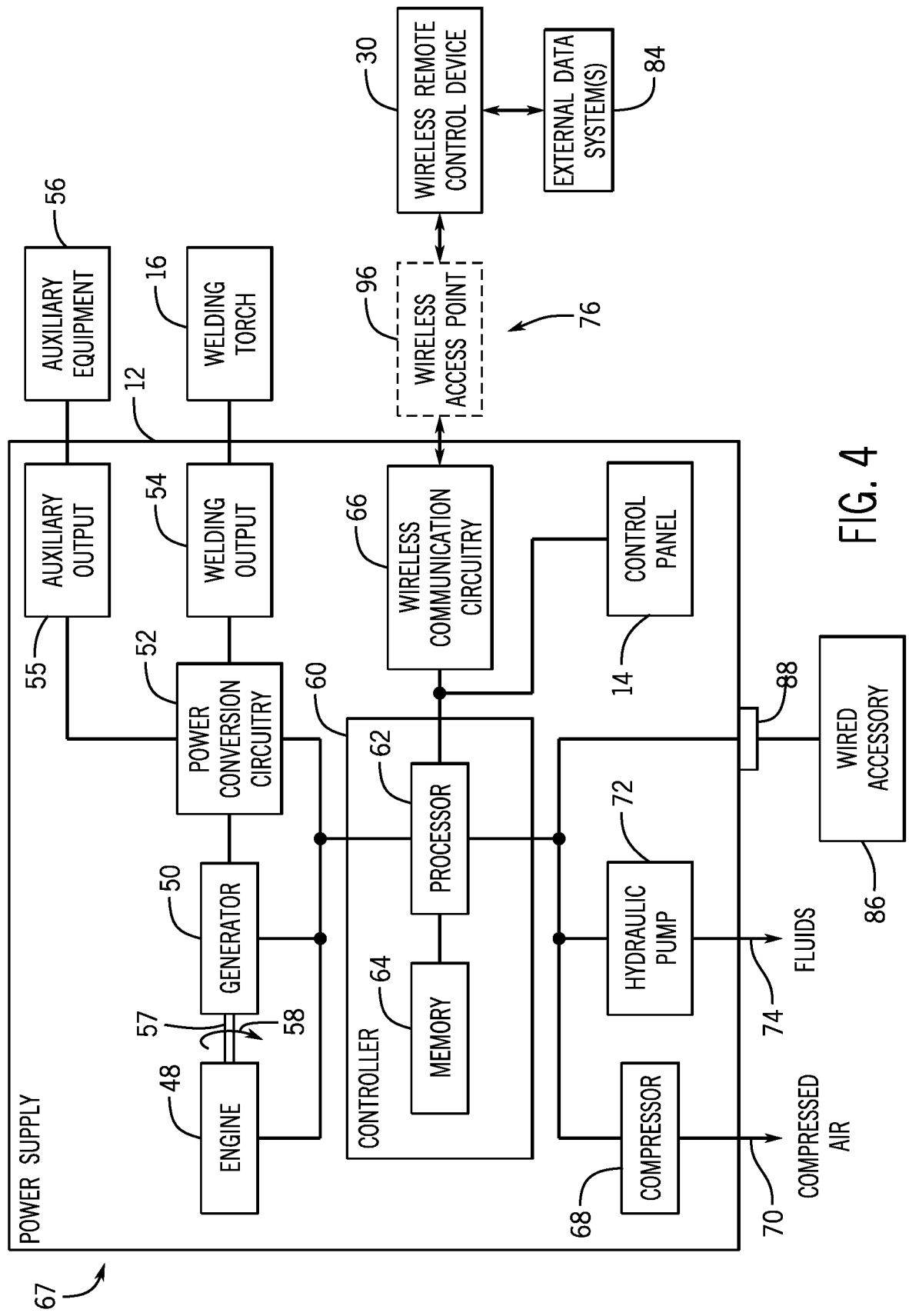
FIG. 4 is a block diagram illustrating exemplary functional components of an embodiment of the engine-driven welding power supply of FIG. 3, in accordance with embodiments of the present disclosure.

As discussed above, the power supply 12 illustrated in FIG. 1 is merely exemplary and not intended to be limiting. For example, in certain embodiments, the power supply 12 may be an engine-driven welding power supply, such as illustrated in FIG. 3. FIG. 4 is a block diagram illustrating exemplary functional components of an embodiment of the engine-driven welding power supply 12. Although illustrated in FIG. 4 as being an engine-driven welding power supply 12 capable of being powered by gasoline or natural gas, in other embodiments, the welding power supply 12 may not be engine-driven, but rather may be powered by other types of power sources as discussed above with respect to FIG. 1. For example, in certain embodiments, the welding power supply 12 may be powered by a lithium-ion battery, a lithium-magnesium battery, a fuel cell, a solid state energy storage device such as a silicon-based capacitor, or any chemically based energy storage device, for example, a lead acid battery, any of which may either be disposed within an enclosure 67 of the welding power supply 12 or external to the welding power supply 12.

In the engine-driven embodiment illustrated in FIG. 4, instead of utilizing power from an external power source, the engine-driven power supply 12 includes an engine 48, a generator 50, and power conversion circuitry 52 for generating welding power via a welding output 54 for delivery to the welding torch 16 and, in certain embodiments, for generating auxiliary power via an auxiliary output 55 for delivery to auxiliary equipment 56, such as a second welding power supply, lighting systems, grinding machines, and so forth. The generator 50 is coupled to the engine 48 via a shaft 57 that is configured to rotate, as indicated by arrow 58.

The power supply 12 includes a controller 60 configured to control operation of the power supply 12. In particular, in certain embodiments, the controller 60 of the power supply 12 includes one or more processor(s) 62 configured to execute program instructions stored in a tangible non-transitory computer-readable medium, such as the memory 64. For example, in certain embodiments, the memory 64 may store software including instructions for controlling the components of the power supply 12, instructions for interacting with wireless communication circuitry 66 to wirelessly communicate with the wireless remote control device 30, security keys that are used to check whether the wireless communication circuitry 66 is authorized to communicate with the wireless remote control device 30, and vice versa, and so forth. The processor(s) 62 may include a general purpose processor, system-on-chip (SoC) device, application-specific integrated circuit (ASIC), or other processor configuration. Similarly, the memory 64 may include, for example, random-access memory (RAM), read-only memory (ROM), flash memory (e.g., NAND), and so forth.

During operation, a rotor of the generator 50 is driven into rotation within a stator of the generator 50 by the engine 48, thereby generating AC power. That is, the shaft 57 rotates, as shown by arrow 58, to transmit power from the engine 48 to the generator 50. The shaft 57 also connects the engine 48 and the generator 50 for proper alignment while resisting bending and axial loads. The engine 48 and the generator 50 cooperate to generate power that may be converted into the welding power via the welding output 54 and, in certain embodiments, the auxiliary power via the auxiliary output 55 by the power conversion circuitry 52.

The operation of the power supply 12 is regulated and controlled by the controller 60. For example, the controller 60 regulates and controls the operation of the engine 48 via a bi-directional exchange of information between the engine 48 and the controller 60. The controller 60 may receive one or more inputs from the operator via the control panel 14 and may regulate engine performance according to the operator inputs. For instance, a user may specify the type of welding process (e.g., AC stick welding, AC TIG welding, DC stick welding, DC MIG welding, etc.), voltage and/or current settings for the welding process, and so forth, and the controller 60 may determine an appropriate engine speed, among many other operating parameters, based on such inputs. The controller 60 may similarly control operation of the generator 50, the power conversion circuitry 52, and other components of the power supply 12.

As also illustrated in FIG. 4, the power supply 12 includes wireless communication circuitry 66 configured to facilitate wireless communication with the wireless remote control device 30. In certain embodiments, the wireless communication circuitry 66 may include RF communication circuitry, such as RF transmitters and sensors. In other embodiments, a radio subsystem and an associated signaling protocol may be implemented to wirelessly send and receive commands and data between the power supply 12 and the wireless remote control device 30. However, in other embodiments, any suitable means for communicating wirelessly between the power supply 12 and the wireless remote control device 30 may be utilized. In certain embodiments where a telecommunication (e.g., cellular, satellite, etc.) infrastructure is not readily available (e.g., at a remote construction site), a local wireless access point (WAP) 96, such as point-to-point WI-FI, may be used to facilitate local wireless communication between the wireless communication circuitry 66 of the welding power supply 12 and the wireless remote control device 30.

In addition, in certain embodiments, the wireless communication circuitry 66 may include one or more processor(s) (i.e., similar to the one or more processor(s) 62 of the controller 60 of the power supply 12) configured to execute program instructions stored in a tangible non-transitory computer-readable medium (i.e., similar to the memory 64 of the controller 60 of the power supply 12) for enabling the wireless communication with the wireless remote control device 30, including pairing with the wireless remote control device 30, enabling prioritization of control between the welding power supply 12 and the wireless remote control device 30, enabling control of the welding power supply 12 via the wireless remote control device 30, and so forth. Furthermore, in certain embodiments, security keys that are used to check whether the wireless communication circuitry 66 is authorized to communicate with the wireless remote control device 30, and vice versa, may be stored in the computer-readable medium of the wireless communication circuitry 66. It will be appreciated that while the controller 60 and the wireless communication circuitry 66 are described herein as being separate components, in certain embodiments, the controller 60 and the wireless communication circuitry 66 may collectively function as integrated control circuitry of the welding power supply 12.

In certain embodiments, all of the components, including the wireless communication circuitry 66, of the welding power supply 12 illustrated in FIG. 4 may be disposed in a common housing (i.e., enclosure) 67. In such embodiments, the wireless communication circuitry 66 functions as the coordinator for the wireless communication network 76 between the welding power supply 12 and the wireless remote control device 30 local to (e.g., resident within) the welding power supply 12, as opposed to having coordination functionality being located remote from (e.g., external to) the welding power supply 12. However, in other embodiments, the wireless communication circuitry 66 may be disposed external to the housing 67 of the welding power supply 12. For example, in certain embodiments, the wireless communication circuitry 66 may be disposed in a separate housing that is configured to directly connect to the welding power supply 12. In particular, the separate housing that encompasses the wireless communication circuitry 66 may include one or more external connectors disposed on the housing that are configured to mate with one or more ports on the welding power supply 12 (e.g., via the control panel 14, for example), thereby enabling the wireless communication circuitry 66 to communicate with the controller 60 of the welding power supply 12, the control panel 14 of the welding power supply 12, and so forth. As such, in certain embodiments, the wireless remote control functionality enabled by the wireless communication circuitry 66 as described herein may be retrofitted into pre-existing welding power supplies 12. It will be appreciated that once such a retrofit communication module is connected to a pre-existing welding power supply 12, the wireless communication circuitry 66 of the retrofit communication module may cooperate with the controller 60, control panel 14, and all other components, of the welding power supply 12 as described herein to enable the wireless control functionality for a wireless remote control device 30.

As previously discussed, although illustrated in FIG. 4 as including an engine-driven welding power supply 12, the wireless remote control protocols and methods described herein may be used with any type of welding power supplies, line-powered, engine-driven, or otherwise. For example, in certain embodiments, as opposed to being an engine-driven welding power supply 12 having an engine 48 that drives a generator 50 to produce power that is converted into welding power via a welding output 54 and, in certain embodiments, auxiliary power via an auxiliary output 55 by the power conversion circuitry 52, the welding power supply 12 may instead receive power from an external source, such as an electrical grid, and the power conversion circuitry 52 may convert this power to the welding power via the welding output 54, the auxiliary power via the auxiliary output 55, and so forth.

In general, all of the components illustrated in FIG. 4 as being included in the welding power supply 12 may be disposed in a common housing or enclosure 67 of the welding power supply 12. For example, in certain embodiments, the welding power supply 12 may include a compressor 68 that is powered by the engine 48 and/or the generator 50, and is utilized to produce compressed air 70 for use in the welding application, without the need for an intermediate storage tank. For example, although not illustrated in FIG. 4, in certain embodiments, the compressor 68 may be coupled to the engine 48 (e.g., directly via a shaft or indirectly via a system of belts) and driven by the engine 48. In other embodiments, the compressor 68 may be directly or indirectly coupled to, and driven by, the generator 50. In addition, in certain embodiments, the welding power supply 12 may include a hydraulic pump 72 that is powered by the engine 48 and/or the generator 50, and is utilized to pump fluids 74 for use in the welding application. For example, although not illustrated in FIG. 4, in certain embodiments, the hydraulic pump 72 may be coupled to the engine 48 (e.g., directly via a shaft or indirectly via a system of belts) and driven by the engine 48. In other embodiments, the hydraulic pump 72 may be directly or indirectly coupled to, and driven by, the generator 50.

Once the wireless remote control device 30 and the welding power supply 12 are paired with each other, as described in greater detail herein, any number of operational parameters and statuses of the welding power supply 12 may be controlled by the wireless remote control device 30. Examples of the types of control modes that may be controlled by the user using the wireless remote control device 30 are described in U.S. patent application Ser. No. 14/229,312, entitled "SYSTEMS AND METHODS FOR WIRELESS CONTROL OF A WELDING POWER SUPPLY," filed Mar. 28, 2014, which is incorporated herein in its entirety for all purposes.

Figure 5A:
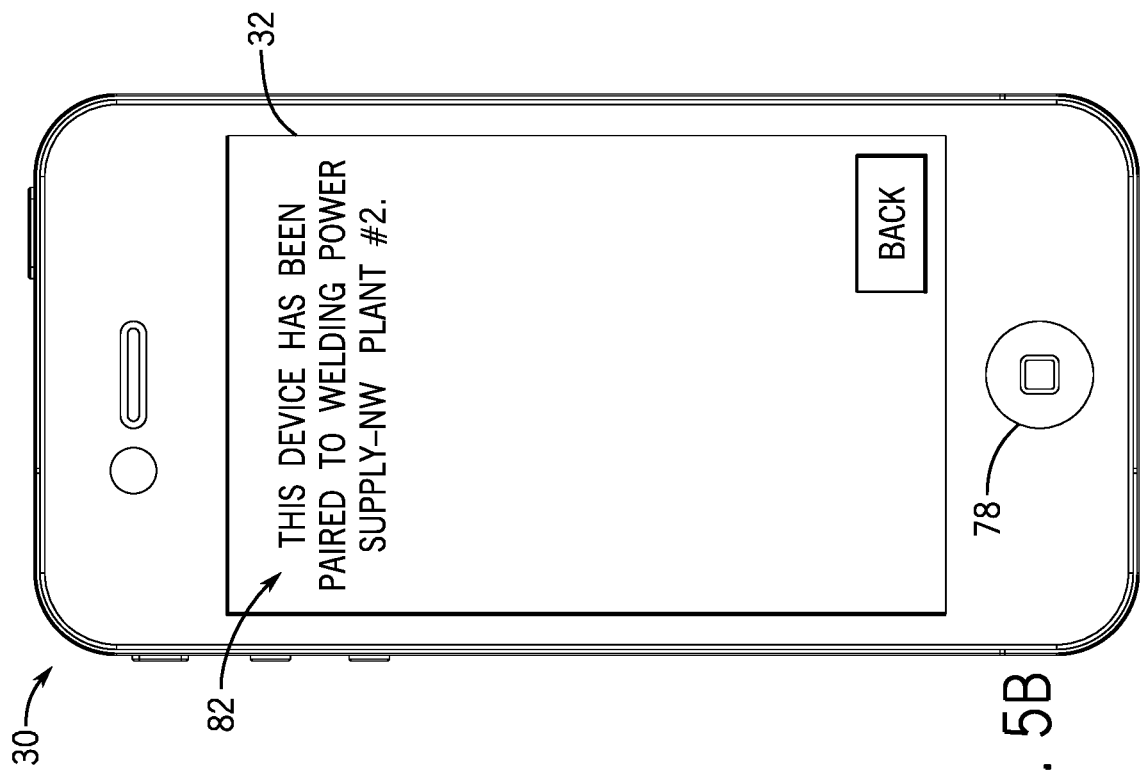
FIGS. 5A and 5B illustrate the wireless remote control device configured to initiate pairing of the wireless remote control device with the engine-driven welding power supply of FIG. 4, in accordance with embodiments of the present disclosure.
Figure 5B:
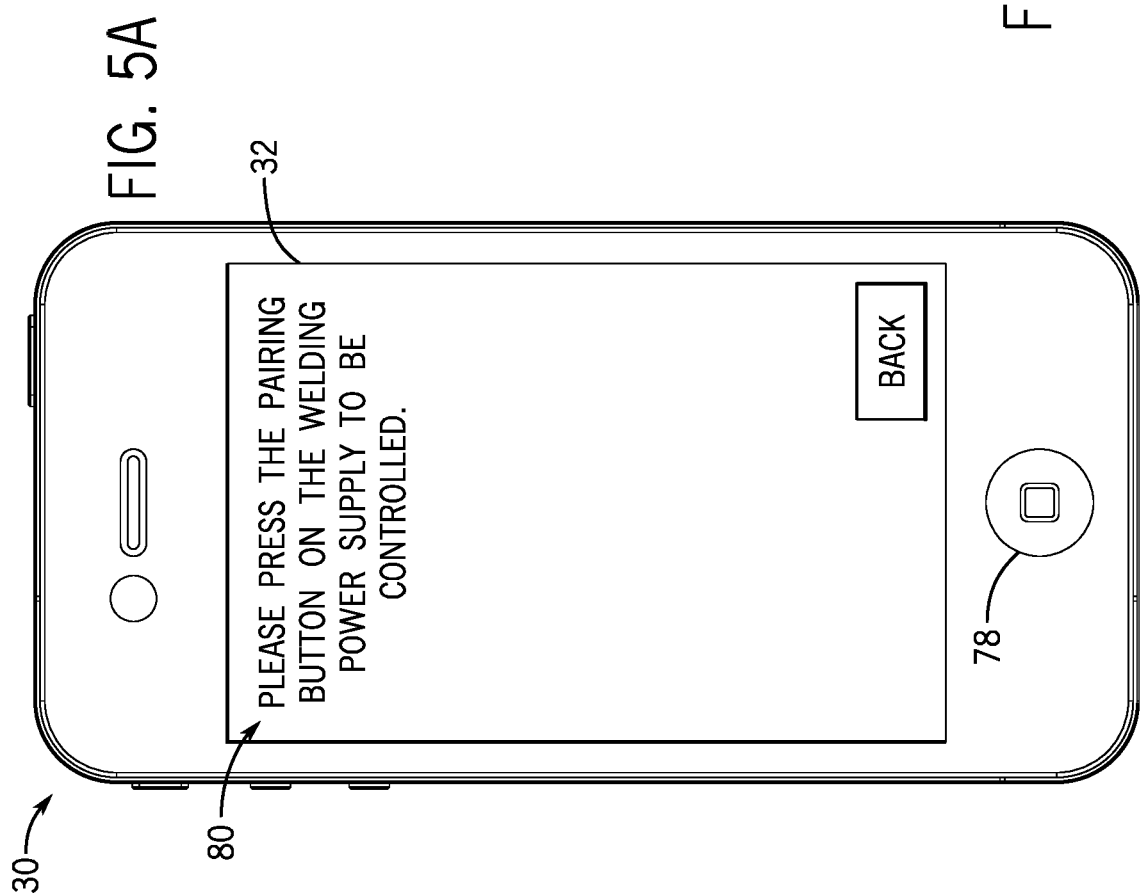

Before the wireless remote control device 30 may begin controlling the welding power supply 12, the wireless communication network 76 between the wireless remote control device 30 and the welding power supply 12 must first be established. In certain embodiments, to establish the wireless communication network 76 between the wireless remote control device 30 and the welding power supply 12, the wireless remote control device 30 and the welding power supply 12 may first be paired to each other. This pairing may be initialized by first pressing a button 78 (i.e., a first synchronization mechanism) on the wireless remote control device 30, as illustrated in FIG. 5A, or a virtual button (i.e., a first synchronization mechanism) on the display 32 of the wireless remote control device 30. Once the pairing procedure has been initiated, a message 80 may be displayed on the display 32 of the wireless remote control device 30 that informs the user that a similar button (i.e., a second synchronization mechanism) on the welding power supply 12 needs to be pressed to complete the pairing process of the wireless remote control device 30 and the welding power supply 12 into the wireless communication network 76. Once the button (i.e., the second synchronization mechanism) on the welding power supply 12 has been pressed, the network 76 may be established by the wireless communication circuitry 66 of the welding power supply 12, which may function as the network coordinator in certain embodiments, as described in greater detail herein. In addition, a message 82 may be displayed on the display 32 of the wireless remote control device 30 that informs the user that the wireless communication network 76 has been established, as illustrated in FIG. 5B.

In certain embodiments, the pairing of the wireless remote control device 30 and the welding power supply 12 may only be initiated when the synchronization mechanisms (e.g., the buttons or virtual buttons) on the wireless remote control device 30 and the welding power supply 12 are simultaneously activated (e.g., pressed). However, it will be appreciated that in other embodiments, the pairing of the wireless remote control device 30 and the welding power supply 12 may be initiated when the synchronization mechanism on the welding power supply 12 is activated within a given time period (e.g., within 15 seconds, within 10 seconds, within 5 seconds, and so forth) after the initial pairing request from the wireless remote control device 30.

Although initiation of the pairing process has been described as being performed from the wireless remote control device 30, it will be appreciated that in certain embodiments, initiation of the pairing process may be performed from the control panel 14 of the welding power supply 12, with the messages being displayed on a display on the control panel 14, the first button press being on the control panel 14 of the welding power supply 12, and the second button press being on the wireless remote control device 30. Again, in certain embodiments, the pairing of the wireless remote control device 30 with the welding power supply 12 may only be initiated when the synchronization mechanisms (e.g., the buttons or virtual buttons) on the wireless remote control device 30 and the welding power supply 12 are simultaneously activated (e.g., pressed). However, it will be appreciated that in other embodiments, the pairing of the wireless remote control device 30 and the welding power supply 12 may be accomplished when the synchronization mechanism on the wireless remote control device 30 is activated within a given time period (e.g., within 15 seconds, within 10 seconds, within 5 seconds, and so forth) after the initial pairing request from the welding power supply 12.

In addition, in other embodiments, other procedures for initiating pairing between the wireless remote control device 30 and the welding power supply 12 may be used. For example, in certain embodiments, the pairing may be initiated by first pressing the button 78 on the wireless remote control device 30, as illustrated in FIG. 5A, or a virtual button on the display 32 of the wireless remote control device 30. Once the pairing procedure has been initiated, confirmation of activation of the button 78 or the virtual button on the display 32 of the wireless remote control device 30 may be confirmed via the control panel 14 of the welding power supply 12, for example, via a display on the control panel 14 or by activation of a button on the control panel 14. Conversely, in other embodiments, the pairing may be initiated by first pressing a button on the control panel 14 of the welding power supply 12. Once the pairing procedure has been initiated, confirmation of activation of the button on the welding power supply 12 may be confirmed via the display of the wireless remote control device 30.

In other embodiments, the pairing process may be initiated by a user entering certain identifying information (e.g., a serial number, a name, a description, a passcode, and so forth, or any combination thereof) relating to the welding power supply 12 via the display 32 of the wireless remote control device 30. Alternatively, the pairing process may be initiated by a user entering certain identifying information (e.g., a serial number, a name, a description, a passcode, and so forth, or any combination thereof) relating to the wireless remote control device 30 via the control panel 14 of the welding power supply 12. In such embodiments, assuming that both the wireless remote control device 30 and the welding power supply 12 include the appropriate security (e.g., encryption) keys, and that the information entered by the user is correct, the pairing between the wireless remote control device 30 and the welding power supply 12 is allowed.

In yet other embodiments, to facilitate initiation of the pairing process, one or more of the wireless remote control device 30 and the welding power supply 12 may be configured to provide a pairing cue to an operator, and information relating to the cue may be entered in the other of the wireless remote control device 30 and the welding power supply 12. In certain embodiments, the pairing cue may be a visual indication (e.g., a flashing display, special characters on an alphanumeric display, flashing light emitting diodes, characters, or lamps that illuminate, and so forth) or an aural indication (e.g., a buzzer, a loudspeaker with a tone alert or a recorded voice, and so forth). Such embodiments facilitate pairing of welding power supplies 12 that are rack-mounted or otherwise not easily accessible by the operator.

In certain embodiments, once the pairing process has been initiated by either the wireless remote control device 30 or the welding power supply 12, a power level of the wireless communication circuitry 66 (e.g., a power level of a radio transmitter) of the welding power supply 12 may be reduced as a means to avoid inadvertent pairing to unintended devices. In general, once the pairing process has been completed and the wireless communication network 76 has been established between the welding power supply 12 and the wireless remote control device 30, the power level of the wireless communication circuitry 66 may be increased back to a normal level, for example, back to the power level before the pairing process was initiated.

Although many embodiments described herein relate to pairing of a wireless remote control device 30 with a welding power supply 12 that is initiated via manual activation of certain features (e.g., buttons, and so forth) on both of the devices, in other embodiments, the pairing between a wireless remote control device 30 and a welding power supply 12 may be initiated using other methods. For example, a given wireless remote control device 30 may be pre-programmed to be paired with a particular welding power supply 12, or vice versa, when manufactured in a factory. Furthermore, in other embodiments, instead of requiring activation of features on both the wireless remote control device 30 and the welding power supply 12, pairing between the devices may be initiated via a single manual synchronization method. In other words, activation of only a feature on a wireless remote control device 30 may be sufficient to initiate synchronization (i.e., pairing) with a welding power supply 12. In such an embodiment, for example, once a user presses a synchronization button on the wireless remote control device 30, a menu option may be displayed via the display 32 of the wireless remote control device 30, whereby the user can select a welding power supply 12 (from a list of welding power supplies 12 having the requisite security keys, for example) with which to pair the wireless remote control device 30. It will be appreciated that a similar single manual synchronization pairing method may also be implemented from the control panel 14 of the welding power supply 12 as well, whereby the user selects a specific wireless remote control device 30 (from a list of wireless remote control devices 30 having the requisite security keys, for example) with which to pair the welding power supply 12.

In general, only one wireless remote control device 30 may be paired with one welding power supply 12 at any given time (i.e., the wireless remote control device 30 and the welding power supply 12 may only be paired together in a 1:1 pairing relationship). In other words, only one wireless remote control device 30 may be capable of remotely controlling a given welding power supply 12 at any given time, and a given welding power supply 12 may only be capable of being remotely controlled by one wireless remote control device 30 at any given time.

However, in certain embodiments, more than one wireless remote control device 30 may be paired with a given welding power supply 12 at any given time, and these wireless remote control devices 30 may be used to control the welding power supply 12 in tandem. As a non-limiting example, in one embodiment, a wireless foot pedal may be used to control amperage of the welding output 54 of the welding power supply 12 and a wireless remote control device 30 may be used to control the type of welding process, starting and/or stopping of the welding power supply 12, and so forth. In such embodiments, a certain type of wireless remote control device 30 may control a certain subset of control features for the welding power supply 12, whereas other types of wireless remote control devices 30 may control other subsets of control features for the welding power supply 12, and the combined subsets of control features may be complementary with each other. In the case where multiple paired wireless remote control devices 30 are both capable of controlling a given feature (e.g., parameter or status) for the welding power supply 12, certain priorities between the multiple paired wireless remote control devices 30 may be stored in the memory 64 of the controller 60, and prioritization of control between the multiple paired wireless remote control devices 30 may be implemented accordingly.

At any given time after the welding power supply 12 and the wireless remote control device 30 have been paired together, a de-pairing procedure may be performed to terminate the pairing between the welding power supply 12 and the wireless remote control device 30. For example, a user may initiate termination of the pairing between a given welding power supply 12 and a paired wireless remote control device 30 by interacting with either the control panel 14 of the welding power supply 12 or the wireless remote control device 30 (e.g., via the display 32 of the wireless remote control device 30). For instance, an option to de-pair the welding power supply 12 from the wireless remote control device 30 may be selected by the user as an option in a menu presented via the display 32 of the wireless remote control device 30 (or, similarly, via the control panel 14 of the welding power supply 12). Once de-pairing is initiated, the controller 60 of the welding power supply 12 may cause the wireless communication circuitry 66 of the welding power supply 12 to terminate the wireless communication network 76 between the welding power supply 12 and the wireless remote control device 30, and signals may be sent to both the control panel 14 of the welding power supply 12 and the wireless remote control device 30 to display to users of the welding power supply 12 and the wireless remote control device 30 that the pairing has been terminated and the wireless communication network 76 between the welding power supply 12 and the wireless remote control device 30 no longer exists.

It will be appreciated that other events may initiate termination of pairing between a given welding power supply 12 and a paired wireless remote control device 30. For example, in the event that the paired wireless remote control device 30 has been outside of the range of the wireless communication network 76 for a certain period of time, the controller 60 of the welding power supply 12 may automatically initiate the de-pairing procedure described above. In such an event, the user of the welding power supply 12 may be provided with a prompt via the control panel 14 of the welding power supply 12 to confirm that the user does, in fact, wish for the pairing between the welding power supply 12 and the wireless remote control device 30 to be terminated. In certain situations, the user may instead wish to leave the wireless communication network 76 in place, and to simply bring the wireless remote control device 30 back into the range of the wireless communication network 76.

In certain embodiments, de-pairing of the wireless remote control device 30 and the welding power supply 12 may not be initiated unless the operator performs an intentional action like re-pairing the wireless remote control device 30 with another welding power supply 12, re-pairing another wireless remote control device 30 to the welding power supply 12, and so forth. Furthermore, the wireless communication network 76 between the paired welding power supply 12 and wireless remote control device 30 is maintained even if the operator turns off the welding power supply 12 or the engine 48 of the welding power supply 12. It will be appreciated that any type of welding power supply 12, line-powered, engine-driven, or otherwise, may utilize the pairing and de-pairing techniques described herein in conjunction with the wireless remote control device 30.

In certain embodiments, once the welding power supply 12 and the wireless remote control device 30 are paired together, the controller 60 of the welding power supply 12 functions as the ZIGBEE™ coordinator for the ZIGBEE™ network 76 created between the welding power supply 12 and the wireless remote control device 30. In other words, the controller 60 of the welding power supply 12 may be responsible for establishing the ZIGBEE™ network 76, maintaining wireless communications via the ZIGBEE™ network 76, etc. The ZIGBEE™ coordinator functionality of the controller 60 is similar to the functionality of the master node devices described in U.S. patent application Ser. No. 13/795,639, entitled "WIRELESS COMMUNICATION NETWORK FOR CONTROL OF INDUSTRIAL EQUIPMENT IN HARSH ENVIRONMENTS," filed Mar. 12, 2013, which is incorporated herein in its entirety for all purposes. It should be noted that the ZIGBEE™ coordinator functionality need not necessarily reside in the welding power supply 12. Rather, in other embodiments, the ZIGBEE™ coordinator functionality may reside in a separate master node device that facilitates communication between the welding power supply 12 and the wireless remote control device 30. In yet other embodiments, the ZIGBEE™ coordinator functionality may reside in the wireless remote control device 30. More specifically, the processor 38 of the wireless remote control device 30 may execute instructions stored on its memory 40 that carry out the ZIGBEE™ coordinator functionality of network association and security, improved robustness, power management and optimization, sensor data transmission, and so forth.

Furthermore, while the wireless communication network 76 established between the welding power supply 12 and the wireless remote control device 30 may be a ZIGBEE™ network 76 (e.g., as message payloads in the 802.15.4 and ZIGBEE™ descriptions) in certain embodiments, other types of wireless communication networks may be established between the welding power supply 12 and the wireless remote control device 30, and the network coordinator functionality may be consistent with these other types of wireless communication networks. Any type of radio standard capable of sending packetized data between the welding power supply 12 and the wireless remote control device 30 may be used to implement the wireless communication techniques described herein. In general, in the wireless communication network 76, there exists a so-called "master node", which effects management (i.e., coordination) of the wireless communication network 76. Other nodes may exist in the wireless communication network 76 for the purpose of exchanging signals (e.g., commands, responses, data, and so forth), and these other nodes may assume local network addressing in conjunction with the master node. In some instances, the temporal relationship for data transfers on the wireless communication network 76 (e.g., which node may send data, and when, and for how long, and so forth) is at least partially set by policy by the master node. These policies may vary based on the type of wireless communication network 76. For example, for WI-FI networks (IEEE 802.11x), the master node is an access point (or wireless access point); for BLUETOOTH networks (IEEE 802.15.1), there is a master node and a slave node; and for ZIGBEE™ networks (IEEE 802.15.4), there is a coordinator that sets the network for a collection of end nodes and routers.

The existing ZIGBEE™ and ZIGBEE™ Pro network definitions, as embodied in their respective network "stacks" and described within documents published by the ZIGBEE™ Alliance (www.zigbee.org) provide for open promiscuous network joining of all devices. However, the control of high-powered electrical equipment such as the welding power supply 12 described herein requires a higher level of security and reliability, both for security of data and for safety use concerns. Accordingly, the embodiments described herein implement more exclusive control over the welding power supply 12 and the types of wireless remote control devices 30 that are allowed to join the wireless communication network 76 and to control the welding power supply 12. In particular, in certain embodiments, a modified version of the released ZIGBEE™ Pro software stack may be implemented, with modifications being made to the security provisions, the pairing procedures, and so forth.

More specifically, the generic public ZIGBEE™ Pro stack generally allows any ZIGBEE™ device to join a network or to use network facilities (i.e., routers) to form a larger mesh network. In contrast, the embodiments described herein restrict all network access to only those devices that are imprinted with security (e.g., encryption) keys. More specifically, in certain embodiments, all wireless communication between the wireless remote control device 30 and the welding power supply 12 (including the pairing procedure) requires that both the wireless remote control device 30 and the welding power supply 12 include security keys stored in memory of the respective devices. During each communication between the wireless remote control device 30 and the welding power supply 12, the devices check that the requisite security keys are present and that the wireless communication may be permitted.

In contrast to conventional techniques, in the embodiments described herein, the security keys are not transmitted between the wireless remote control device 30 and the welding power supply 12. In other words, the security keys are not shared across the wireless communication network 76 between the wireless remote control device 30 and the welding power supply 12. Rather, again, the security keys are either installed in the devices during manufacture (e.g., in the case of the welding power supply 12, where the wireless remote control device 30 is an OEM device, and so forth) or are pre-loaded into the device prior to the wireless communication with the other device.

It will be appreciated that, in many embodiments, the welding power supply 12 will be pre-loaded with the security keys (e.g., stored in the memory 64 of the welding power supply 12) when manufactured. In addition, in certain embodiments, the wireless remote control device 30 will be a dedicated OEM welding device that is specifically manufactured to operate with the welding power supply 12 and, as such, will be pre-loaded with the security keys required to operate with the welding power supply 12. In certain embodiments, all wireless remote control devices 30 equipped with ZIGBEE™ radios will be pre-loaded at the point of manufacture with a minimal code load, such as a "boot loader" designed to pair with a welding power supply 12, operating as a ZIGBEE™ coordinator. During this initial "first pairing", a host servicing the coordinator determines that the wireless remote control device 30 is, for example, an unprogrammed wireless remote control device 30, and then pushes a firmware image of the code (which will operate the welding power supply 12) onto the wireless remote control device 30. When the operator re-starts the wireless remote control device 30, it will then assume the personality of the correct wireless remote control device 30 for the welding power supply 12.

It will be appreciated that, in certain embodiments, the security keys and/or the communication software or firmware may be downloaded into the wireless remote control device 30 at a different time other than during manufacture, for example, prior to the pairing process of the welding power supply 12 and the wireless remote control device 30. As an example, returning now to FIG. 4, the security keys and/or the communication software or firmware may be downloaded from an external data system 84 (e.g., web server, local area network server, and so forth) that the user of the wireless remote control device 30 connects to and, in certain embodiments, logs into using login credentials to provide an added layer of security.

If the wireless remote control device 30 includes the requisite security keys, the wireless communication network 76 may recognize the wireless remote control device 30 and enable pairing of the wireless remote control device 30 with the welding power supply 12. In certain embodiments, once recognized, the controller 60 of the welding power supply 12 may cause a prompt on the display 32 of the wireless remote control device 30 to be displayed that asks for the user of the wireless remote control device 30 to input a passcode that is, for example, displayed on the control panel 14 of the welding power supply 12 to confirm that pairing should proceed.

In general, any wireless remote control device 30 having the requisite security keys will be allowed to join the wireless communication network 76 and be paired to a welding power supply 12. In certain embodiments, the wireless remote control device 30 may only have the software to allow pairing to a coordinator (e.g., a welding power supply 12). In such an embodiment, the coordinator will be programmed to examine the type of the paired wireless remote control device 30 (e.g., whether it is a pressure mat, grinder, general purpose router, universal remote control, and so forth) and, as required, will initiate a code download to the wireless remote control device 30. In such embodiments, the welding power supply 12 will push code of the latest release (e.g., version) to the wireless remote control device 30 via the wireless communication network 76 to enable the wireless remote control device 30 to control operation of the welding power supply 12. Then, the wireless remote control device 30 is re-started, and it begins operation as a wireless remote controller (e.g., pendant) for the welding power supply 12.

In addition, it should be noted that in certain embodiments, dual controls (i.e., enabling control from both the wireless remote control device 30 and a separate wired remote control device) may be enabled. For example, in certain embodiments, changing to this dual control mode may be configurable under software control. As illustrated in FIG. 4, an example of this type of dual control may be when a wired accessory 86, such as a foot pedal, is connected to an accessory connector 88 (e.g., a multi-pin connector, such as a 14-pin connector) of the welding power supply 12, and both the wired accessory 86 and the wireless remote control device 30 are used to control the welding power supply 12. In such a situation, the operator may desire to use the wired accessory 86 when welding in a TIG welding process (e.g., to finely control the welding current), but use the wireless remote control device 30 for other features. It will be appreciated that any type of welding power supply 12, line-powered, engine-driven, or otherwise, may utilize the prioritization techniques described herein in conjunction with the wireless remote control device 30.

Figure 6:
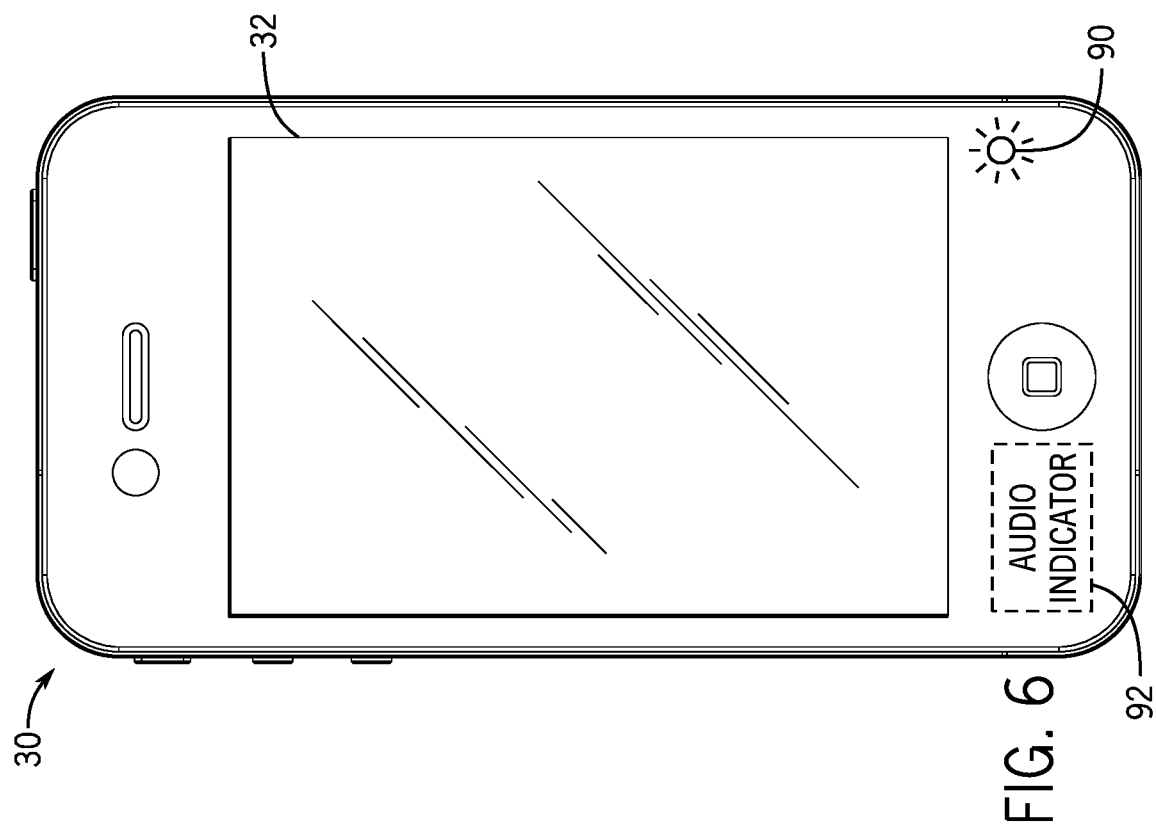
FIG. 6 illustrates the wireless remote control device configured to implement a find function for the wireless remote control device, in accordance with embodiments of the present disclosure.

Once the welding power supply 12 and the wireless remote control device 30 have been paired together, thereby establishing the wireless communication network 76 between them, in certain embodiments, location services may be provided via communication between the welding power supply 12 and the wireless remote control device 30. In certain embodiments, the software or firmware of the wireless remote control device 30 may include a "find" function so that if the wireless remote control device 30 is misplaced, it will have either or both of a visual indicator or an audio indicator that can be activated to indicate the location of the wireless remote control device 30 to the user. In certain embodiments, the wireless remote control device 30 may include a flashing lamp or a flashing display backlight that may be illuminated. For example, as illustrated in FIG. 6, in certain embodiments, the wireless remote control device 30 may include a separate light emitting diode 90 that may be illuminated (or pulsed) to indicate the location of the wireless remote control device 30. In other embodiments, the display 32 of the wireless remote control device 30 itself may be illuminated to indicate the location of the wireless remote control device 30. For example, when the find function is activated (e.g., when a user selects the find function via the control panel 14 of the welding power supply 12, thereby sending a control signal to the wireless remote control device 30), the light level of the display 32 of the wireless remote control device 30 may be pulsed in order to create pulsating light to facilitate identification of the location of the wireless remote control device 30. In other embodiments, the wireless remote control device 30 may be configured to activate an audio indicator 92 (e.g., a buzzer, speaker, piezo transducer, and so forth), which may be internal to the wireless remote control device 30, to facilitate identification of the location of the wireless remote control device 30.

In certain embodiments, the find function may be activated by selecting the find function via the control panel 14 of the welding power supply 12. Once the find function is activated by the user, a signal may be sent wirelessly to the wireless remote control device 30, and the wireless remote control device 30 may activate the light emitting diode 90 and/or the display 32 and/or the audio indicator 92 to cause the visual and/or audio indication to be activated on the wireless remote control device 30 to facilitate identification of the location of the wireless remote control device 30. Alternatively, in certain embodiments, the wireless remote control device 30 itself may initiate activation of the find function in the event, for example, that the wireless remote control device 30 loses its wireless connection to the welding power supply 12 via the communication network 76. For example, in certain embodiments, if the wireless remote control device 30 is moved to a location outside of a wireless communication range with the welding power supply 12 via the communication network 76, the wireless remote control device 30 may cause the visual and/or audio indicators to be activated, thereby alerting nearby users that the wireless remote control device 30 should be brought back into the wireless communication range with the welding power supply 12 to which it is paired.

As described above with respect to FIG. 2, the wireless remote control device 30 includes location circuitry 47 that enables the wireless remote control device 30 to determine its location. At times when the communication network 76 is established between the welding power supply 12 and the wireless remote control device 30, the welding power supply 12 may communicate wirelessly with the wireless remote control device 30 to determine the location information of the wireless remote control device 30. Since, the wireless remote control device 30 is within wireless transmission range of the welding power supply 12, it may be assumed that the welding power supply 12 is in relatively close proximity to the wireless remote control device 30 and, as such, the welding power supply 12 may utilize the location information of the wireless remote control device 30 as its own. Accordingly, when interrogated by external systems with requests for the location of the welding power supply 12, the welding power supply 12 may respond to such requests for location information with the location information of its associated wireless remote control device 30. Therefore, even if the welding power supply 12 does not include location circuitry, such as a GPS system receiver, the wireless remote control device 30 enables the welding power supply 12 to operate as if it does include such location circuitry, for example, by utilizing the location circuitry 47 of the wireless remote control device 30 controlling the welding power supply 12. It will be appreciated that the welding power supply 12 may either simply continually communicate with the wireless remote control device 30 to determine the location information of the wireless remote control device 30, or may periodically store the location information of the wireless remote control device 30 in the memory 64 of the controller 60 of the welding power supply 12.

Figure 7:
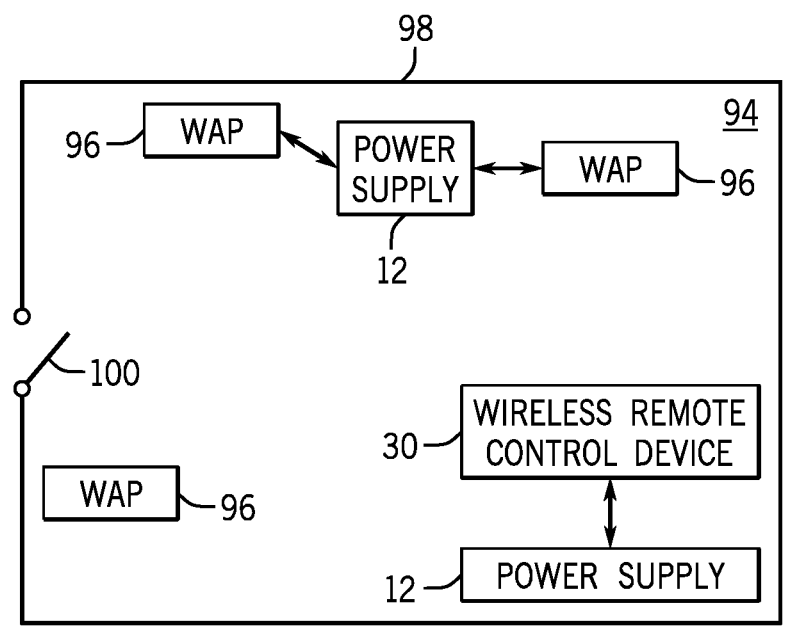
FIG. 7 is a diagram of a work area within which multiple welding power supplies are located, in accordance with embodiments of the present disclosure.

In general, the wireless communication circuitry 66 of the welding power supply 12 enables multiple methods for providing location services for the welding power supply 12. FIG. 7 is a diagram of a work area 94 within which multiple welding power supplies 12 (two welding power supplies 12 in the illustrated embodiment) are located. For example, the work area 94 may be a shipbuilding yard, warehouse, or other construction area, among other work areas. In such work areas 94, there are instances when welding power supplies 12, as well as other welding-related equipment, are at least temporarily misplaced simply because of the sheer size of the work area 94. For example, an employee may move a welding power supply 12, as well as other welding equipment, to a location within the work area 94 and then leave at the end of the work shift. Another employee may plan on using that particular welding power supply 12, or other welding equipment, but may not be able to locate it and time may be lost in the search or in replacing the welding power supply 12 or other welding equipment. In other instances, a welding power supply 12 and/or other welding equipment may be removed from the work area 94 without authorization.

One method for providing location services for the welding power supplies 12 would be to equip each welding power supply 12 with location circuitry, similar to the location circuitry 47 of the wireless remote control device 30, to enable the welding power supplies 12 to determine their own locations. As described herein, another method for providing location services for the welding power supplies 12 is to configure the welding power supplies 12 to utilize their wireless communication circuitry 66 to wirelessly communicate with other devices to approximate their own location based on location data of the devices to which the welding power supplies 12 are wireless communicating. Doing so provides essentially the same location services without the cost of adding location circuitry to the welding power supplies 12

As illustrated in FIG. 7, the work area 94 may include wireless access points (WAPs) 96 disposed within the work area 94. The WAPs 96 facilitate wireless access from the welding power supplies 12 to external system(s) 84 (i.e., via the Internet or other communication protocol) via the wireless communication circuitry 66 of the welding power supplies 12. As illustrated, one of the welding power supplies 12 is within wireless communication range with two of the WAPs and, thus, may access external system(s) 84 via one or both of the WAPs 96. Furthermore, this welding power supply 12 may utilize the location services of the network of the WAPs 96 to approximate its own location. For example, the welding power supply 12 may append its approximate location to all data wirelessly transmitted via the WAPs 96.

In contrast, the second welding power supply 12 illustrated in FIG. 7 is not within wireless communication range with any of the WAPs 96. However, this welding power supply 12 is currently being at least partially controlled by the illustrated wireless remote control device 30. As such, the wireless remote control device 30 may act as a mobile hot spot for this welding power supply 12. Furthermore, location data for the wireless remote control device 30 may be wirelessly communicated to the welding power supply 12, and the welding power supply 12 may use the location data of the wireless remote control device 30 as an approximation for its own location. Moreover, in addition to the locations services provided to the welding power supply 12 by the wireless remote control device 30 and the WAPs 96, the wireless communication circuitry 66 of the welding power supplies 12 enables wireless transmission usage data for the welding power supplies 12 to be shared (e.g., with external system(s) 84 via the Internet) so that, for example, managers may review productivity reports that are generated based on such usage data.

In addition, as illustrated in FIG. 7, in certain embodiments, the work area 94 may include a fence 98 or other surrounding structure (e.g., wall, building, etc.) that surrounds a perimeter of the work area 94. One of the WAPs 96 may be located near an entry/exit location (e.g., a gate) 100 of the work area 94 so that if a welding power supply 12 (or other welding-related equipment) enters or exits the work area 94, the event may be noted (e.g., by external monitoring systems communicatively coupled to the WAP 96 located near the entry/exit location 100). As such, simple loss prevention may be mitigated, or at least it can be noted that a welding-related asset (e.g., a welding power supply 12) has left the work area 94. It will be appreciated that wireless remote control devices 30 associated with such assets (e.g., welding power supplies 12) may enable continuous monitoring of the location of the assets with respect to the work area 94. It will also be appreciated that, in certain embodiments, the fence 98 illustrated in FIG. 7 may not be a physical fence, but rather a "virtual fence" that is established by the ability of the WAPs 96 and various wireless remote control devices 30 to continuously monitor the work area 94, which enables continuous monitoring of the assets within the work area 94.

By using the location services of the wireless remote control device 30 controlling the welding power supply 12 as a proxy for location services of the welding power supply 12 enables better precision in locating the welding power supply 12 without the need to equip the welding power supply 12 with dedicated location circuitry, such as a GPS receiver. In addition, productivity improvements may be achieved, as well as enhanced theft prevention, as described herein.

An additional advantage of utilizing the location circuitry 47 of the wireless remote control device 30 to estimate a location of the welding power supply 12 is that, in certain embodiments, the wireless remote control device 30 may function as temporary data storage for the welding power supply 12 in, for example, situations where the welding power supply 12 does not have access to a telecommunications infrastructure such that data from the welding power supply 12 may be sent to external data system(s) 84 (e.g., external data processing systems and databases, cloud processing and storage, and so forth). Such external data system(s) 84 may include, for example, performance monitoring systems as disclosed in U.S. Patent Application Publication No. 2014/0277684, entitled "WELDING RESOURCE PERFORMANCE GOAL SYSTEM AND METHOD," filed Mar. 15, 2013, which is incorporated herein in its entirety for all purposes.

In recent years, it has become increasingly important for construction contractors to maintain weld quality and production data for operational diagnostics, reporting, and so forth, for several years (e.g., up to 20 years). Certain welding power supplies 12, such as engine-driven welding power supplies 12, are often used in construction job sites (such as cross-country transmission pipelines) that do not have access to telecommunication infrastructures, such as cellular networks, satellite networks, Internet, cloud storage, and so forth. Accordingly, such remotely located welding power supplies 12 are not capable of sending operational data relating to the welding power supply 12 or devices related to the welding power supply 12 (e.g., welding torch 16, auxiliary equipment 56, etc.) to external data system(s) 84 for storage, processing, and so forth.

In such situations, a wireless remote control device 30 being used to control a particular welding power supply 12 may function as temporary (e.g., buffer) data storage for the welding power supply 12. In particular, to overcome the difficulty (or, indeed, impossibility) of maintaining reliable connectivity to external data system(s) 84 in such remotely located construction sites, operational data may be transmitted to the wireless remote control device 30 via the wireless communication circuitry 66 and recorded in the memory 40 and/or storage 42 of the wireless remote control device 30 during operation of the welding power supply 12. The operational data transmitted to, and stored in, the wireless remote control device 30 may include, but is not limited to, power, current, and/or voltage outputted by the welding output 54 of the welding power supply 12, fault codes and diagnostics data, weld production statistics (e.g., number and type of produced welds), welding process signal waveforms outputted from the welding output 54 of the welding power supply 12, weld quality, motion data of the welding torch 16, weld joint and seam data, consumables usage, and so forth.

Furthermore, in certain embodiments, the wireless remote control device 30 may tag the operational data with location data (e.g., using its location circuitry 47) when the operational data is received from the welding power supply 12. As such, although the welding power supply 12 (and, indeed, the wireless remote control device 30) may not have access to external data system(s) 84 while at the remote construction site, the location data (e.g., via the location circuitry 47) may still be available to the wireless remote control device 30 and, therefore, the operational data received from the welding power supply 12 may still be tagged when it is received by, and stored in, the wireless remote control device 30. Then, once the wireless remote control device 30 is moved to a location that has access to external data system(s) 84 (e.g., the wireless remote control device 30 is moved to a location having cellular coverage, satellite coverage, and so forth), the stored and location tagged (e.g., geotagged) data may be transmitted from the wireless remote control device 30 to the external data system(s) 84. It will be appreciated that, in certain embodiments, once the wireless remote control device 30 receives return confirmation that the data has been received by the external data system(s) 84, the wireless remote control device 30 may delete the data from its memory 40 and/or storage 42.

In certain embodiments, the welding power supply 12 may not always transmit the operational data to the wireless remote control device 30. Rather, in certain embodiments, the controller 60 of the welding power supply 12 may determine when the wireless communication circuitry 66 of the welding power supply 12, or when the wireless remote control device 30, does not have access to (or has unreliable access to) external data system(s) 84. In times where the controller 60 determines that access to external data system (s) is either non-existent or unreliable, the operational data may be transmitted to the wireless remote control device 30 for temporary storage and location tagging. In other words, in certain embodiments, the operational data may be transmitted to the wireless remote control device 30 for temporary storage and location tagging only when the controller 60 determines that the wireless communication circuitry 66 of the welding power supply 12, or when the wireless remote control device 30, does not have access to (or has unreliable access to) external data system(s) 84.

Although primarily described herein as utilizing location circuitry 47 of the wireless remote control device 30 to estimate a location of the welding power supply 12 using the location data of the wireless remote control device 30 as an approximation, in other embodiments, as described above, the welding power supply 12 may include its own location circuitry (e.g., similar to the location circuitry 47 of the wireless remote control device 30) to determine a location of the welding power supply 12, and this location data of the welding power supply 12 may be shared with the wireless remote control device 30 via the wireless communication network 76, and the wireless remote control device 30 may utilize the location data of the welding power supply 12 for control purposes and/or to relay to external system(s) 84 that inquire about the location of the welding power supply 12.

Furthermore, although primarily described herein as utilizing wireless communication as the method for conveying location data to the welding power supply 12, in other embodiments, the welding power supply 12 may be connected to a location services device via the welding cable 18 of the welding power supply 12. The location services device may be configured to determine location data (e.g., using location circuitry similar to the location circuitry 47 of the wireless remote control device 30) and to convey the location data to the welding power supply via the weld cable 18 using weld cable communications. Exemplary weld cable communication circuitry that may facilitate such weld cable communications is disclosed in U.S. Pat. No. 8,592,724, entitled "REMOTE WIRE FEEDER USING BINARY PHASE SHIFT KEYING TO MODULATE COMMUNICATIONS OF COMMAND/CONTROL SIGNALS TO BE TRANSMITTED OVER A WELD CABLE," issued Nov. 26, 2013, and U.S. Patent Application Publication No. 2007/0080154, entitled "REMOTE WIRE FEEDER USING BINARY PHASE SHIFT KEYING TO MODULATE COMMUNICATIONS OF COMMAND/CONTROL SIGNALS TO BE TRANSMITTED OVER A WELD CABLE," filed Dec. 12, 2006, both of which are incorporated herein in their entireties for all purposes.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A welding power supply comprising:
power conversion circuitry configured to convert an input power into an output power for a welding operation;
wireless communication circuitry configured to transmit data to an external data system by wirelessly communicating with a telecommunications infrastructure and configured to wirelessly communicate with a portable electronic device; and
control circuitry configured to:
control operation of the power conversion circuitry based at least in part on commands received wirelessly from the portable electronic device;
generate operational data relating to the welding power supply or a device related to the welding power supply;
while connectivity with the external data system is available via the telecommunications infrastructure, communicate the operational data to the external data system; and
while connectivity with the external data system via the telecommunications infrastructure is not available, communicate the operational data to the portable electronic device for transmission to the external data system.

2. The welding power supply of claim 1, wherein the controller is configured to transmit the operational data to the portable electronic device for temporary storage and geotagging when the controller determines that the wireless communication circuitry has no access or limited access to the telecommunication infrastructure.

3. The welding power supply of claim 1, wherein the controller is configured to receive a request for a location of the welding power supply from an external system, and to respond to the request for the location of the welding power supply with the location data of the portable electronic device.

4. The welding power supply of claim 1, wherein the controller is configured to store the location data of the portable electronic device in a memory of the welding power supply.

5. The welding power supply of claim 1, wherein the pairing and the wireless communication are secured using security keys stored in both the portable electronic device and the controller, and wherein the security keys are not shared between the portable electronic device and the controller via the wireless communication network during the pairing or the wireless communication.

6. The welding power supply of claim 1, wherein the controller is configured to pair the portable electronic device with the welding power supply in a 1:1 paired relationship.

7. The welding power supply of claim 1, wherein the wireless communication network is an IEEE 802.11x-based WI-FI wireless network.

8. The welding power supply of claim 1, wherein the wireless communication network is an IEEE 802.15.1 BLUETOOTH wireless network.

9. The welding power supply of claim 1, wherein the wireless communication network is an IEEE 802.15.4 wireless network with or without a ZIGBEE™ software stack.

10. The welding power supply of claim 1, wherein the portable electronic device is a cellular radio telephone.

11. The welding power supply of claim 1, wherein the portable electronic device is a satellite radio telephone.

12. The welding power supply of claim 1, wherein the portable electronic device is a laptop computer.

13. The welding power supply of claim 1, wherein the portable electronic device is a tablet computer.

14. The welding power supply of claim 1, wherein the portable electronic device is a dedicated original equipment manufacturer (OEM) remote control device.

15. The welding power supply of claim 1, wherein the welding power supply is an engine-driven welding power supply.

16. The welding power supply of claim 1, wherein the welding power supply is powered by a lithium-ion battery, a lithium-magnesium battery, or a fuel cell.

17. A method comprising:
pairing a portable electronic device with a welding power supply in a wireless communication network;
controlling operation of the welding power supply based at least in part on commands received wirelessly from the portable electronic device via the wireless communication network; and
setting location data for the welding power supply equal to location data of the portable electronic device;
generating operational data, including the location data, relating to the welding power supply or a device related to the welding power supply;
while connectivity with an external data system is available via a telecommunications infrastructure, communicating the operational data to the external data system via the telecommunications infrastructure; and
while connectivity with the external data system via the telecommunications infrastructure is not available, communicating the operational data to the portable electronic device for transmission to the external data system.

18. The method of claim 17, comprising temporarily storing and location tagging the operational data in the portable electronic device when the portable electronic device has no access or limited access to the telecommunication infrastructure.

19. The method of claim 17, comprising receiving a request for a location of the welding power supply from the external computing system, and responding to the request for the location of the welding power supply with the location data of the portable electronic device.

20. The method of claim 17, comprising storing the location data of the portable electronic device in a memory of the welding power supply.

21. The method of claim 17, wherein pairing the portable electronic device with the welding power supply in the wireless communication network comprises using security keys stored in both the portable electronic device and the welding power supply, and wherein the security keys are not shared between the portable electronic device and the welding power supply via the wireless communication network during the pairing.

22. The method of claim 17, wherein pairing the portable electronic device with the welding power supply in the wireless communication network comprises pairing the portable electronic device with the welding power supply in a 1:1 paired relationship.

23. The method of claim 17, wherein the wireless communication network is an IEEE 802.11x-based WI-FI wireless network, an IEEE 802.15.1 BLUETOOTH wireless network, an IEEE 802.15.4 ZIGBEE™ wireless network, or any other wireless network.

24. The method of claim 17, wherein the portable electronic device is a cellular radio telephone, a satellite radio telephone, a laptop computer, a tablet computer, or a dedicated original equipment manufacturer (OEM) remote control device.

* * * * *